United States Patent
Nakajima et al.

(10) Patent No.: US 9,624,367 B2
(45) Date of Patent: *Apr. 18, 2017

(54) PNEUMATIC TIRE

(71) Applicant: SUMITOMO RUBBER INDUSTRIES, LTD., Kobe-shi, Hyogo (JP)

(72) Inventors: Hiroki Nakajima, Kobe (JP); Takayuki Nagase, Kobe (JP); Shigeki Otsubo, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,613

(22) Filed: Aug. 21, 2015

(65) Prior Publication Data

US 2016/0068672 A1    Mar. 10, 2016

(30) Foreign Application Priority Data

Sep. 5, 2014 (JP) ................................. 2014-181448

(51) Int. Cl.
| | | |
|---|---|---|
| *C08L 33/08* | (2006.01) | |
| *C08L 21/00* | (2006.01) | |
| *B60C 1/00* | (2006.01) | |
| *C08L 9/00* | (2006.01) | |
| *C08L 9/06* | (2006.01) | |

(52) U.S. Cl.
CPC ............ *C08L 33/08* (2013.01); *B60C 1/0016* (2013.04); *C08L 9/00* (2013.01); *C08L 9/06* (2013.01); *C08L 21/00* (2013.01)

(58) Field of Classification Search
CPC .. C08L 9/00; C08L 33/08; C08L 33/10; C08L 2205/03; B60C 1/0016
See application file for complete search history.

(56) References Cited

U.S. PATENT DOCUMENTS 4,414,370 A * 11/1983 Hamielec .................. C08F 2/02
526/209

FOREIGN PATENT DOCUMENTS

| EP | 0890605 B1 * | 4/2003 |
| JP | 2000-159935 A | 6/2000 |
| JP | 2004-137463 A | 5/2004 |
| JP | 2006274051 A * | 10/2006 |

OTHER PUBLICATIONS

Fudow NIKANOL® Xylene Resin product data sheet, pp. 1-4, 2009.*
U.S. Office Action dated Apr. 26, 2016, for U.S. Appl. No. 14/832,143.

* cited by examiner

*Primary Examiner* — Robert Jones, Jr.
(74) *Attorney, Agent, or Firm* — Birch, Stewart, Kolasch & Birch, LLP

(57) ABSTRACT

The present invention provides a pneumatic tire that achieves a balanced improvement in initial grip performance, grip performance during running, and abrasion resistance. The present invention relates to a pneumatic tire including a tread formed from a rubber composition, the rubber composition containing a rubber component, a solventless acrylic resin, and a liquid xylene resin, and having a solventless acrylic resin content of 1 to 50 parts by mass and a liquid xylene resin content of 5 to 100 parts by mass, each per 100 parts by mass of the rubber component.

3 Claims, No Drawings

PNEUMATIC TIRE

TECHNICAL FIELD

The present invention relates to a pneumatic tire including a tread formed from a rubber composition.

BACKGROUND ART

It is desired for treads for tires and especially for high-performance tires to maintain excellent handling stability (grip performance) on dry roads from the initial stage to the end of running. In other words, it is desired for them to maintain good grip performance during running, in addition to excellent initial grip performance.

Methods for improving grip performance by adding a resin with a specific softening point to a rubber composition for treads have been considered (see, for example, Patent Literature 1). In exemplary methods that have been considered, the amount of a low softening point resin, a liquid polymer, or the like is increased, or a low temperature softener is added, for the purpose of improving initial grip performance. For the purpose of achieving stable grip performance during running (hereafter, referred to as "grip performance during running"), on the other hand, a method of adding a high softening point resin to a rubber composition for treads has been considered.

In tires including a tread that contains a low softening point resin, however, grip performance during running is unfortunately lowered along with an increase in the temperature of the tread, though initial grip performance is improved.

In tires including a tread that contains a high softening point resin such as a coumarone-indene resin, on the other hand, initial grip performance is unfortunately greatly lowered though grip performance during running is ensured.

To solve these problems, a method of adding a combination of a low softening point resin and a high softening point resin to a rubber composition can be considered. However, since the combined amount of resins added to a rubber composition greatly affects the thermal properties of the whole rubber, the combined amount of resins that can be added to a rubber composition is limited. Consequently, the rubber composition containing a low softening point resin and a high softening point resin in combination shows lower initial grip performance and lower grip performance during running than when the respective resins are solely used. Thus, there is a need to develop techniques that simultaneously highly improve initial grip performance and grip performance during running while ensuring good abrasion resistance.

CITATION LIST

Patent Literature

Patent Literature 1: JP-A 2004-137463

SUMMARY OF INVENTION

Technical Problem

The present invention aims to solve the above problems and provide a pneumatic tire that achieves a balanced improvement in initial grip performance, grip performance during running, and abrasion resistance.

Solution to Problem

The present invention relates to a pneumatic tire, including a tread formed from a rubber composition, the rubber composition containing a rubber component, a solventless acrylic resin, and a liquid xylene resin, and having a solventless acrylic resin content of 1 to 50 parts by mass and a liquid xylene resin content of 5 to 100 parts by mass, each per 100 parts by mass of the rubber component.

The solventless acrylic resin preferably has a glass transition temperature of 0° C. to 100° C.

The solventless acrylic resin preferably has an acid value of 15 to 250 mgKOH/g.

The solventless acrylic resin preferably has a weight average molecular weight of 2000 to 20000.

The solventless acrylic resin is preferably a solventless styrene acrylic resin.

The liquid xylene resin preferably has an acid value of 10 to 300 mgKOH/g.

The liquid xylene resin preferably has a viscosity at 25° C. of 20000 mPa·s or less.

The rubber composition preferably further contains a thermoplastic acrylic acid ester polymer.

The thermoplastic acrylic acid ester polymer preferably has a glass transition temperature of −60° C. to 20° C.

The thermoplastic acrylic acid ester polymer preferably has a weight average molecular weight of 100000 to 1200000.

The thermoplastic acrylic acid ester polymer is preferably produced by suspension polymerization.

The pneumatic tire is preferably a high-performance tire.

The high-performance tire is preferably a high-performance dry tire.

Advantageous Effects of Invention

A pneumatic tire according to the present invention includes a tread formed from a rubber composition that contains a rubber component, a specific amount of a solventless acrylic resin, and a specific amount of a liquid xylene resin, and therefore achieves a balanced improvement in initial grip performance, grip performance during running, and abrasion resistance, especially on dry roads.

DESCRIPTION OF EMBODIMENTS

In conventional methods, resins are added to improve grip performance. The resins conventionally added presumably improve viscoelastic characteristics and thereby improve grip performance. In other words, it is presumed that the improvement of grip performance depends on the softening point of the added resin. Thus, such methods allow only one of initial grip performance and grip performance during running to be improved depending on the softening point of the resin used.

In the present invention, in contrast, grip performance during running, especially on dry roads, is highly improved presumably because of the use of a solventless acrylic resin which improves grip performance not only by improving viscoelastic characteristics as described above, but also by imparting tackiness to the road surface to the tread rubber.

Further, in the present invention, the solventless acrylic resin is used together with a liquid xylene resin which modifies a part of the solventless acrylic resin to enable a great improvement in initial grip performance and abrasion resistance while maintaining the same grip performance during running as obtained when the solventless acrylic resin is solely used. It is to be noted that the term "grip performance" as used alone hereinafter includes both initial grip performance and grip performance during running.

The pneumatic tire of the present invention includes a tread formed from a rubber composition that contains a rubber component, a solventless acrylic resin, and a liquid xylene resin, and has a solventless acrylic resin content of 1 to 50 parts by mass and a liquid xylene resin content of 5 to 100 parts by mass, each per 100 parts by mass of the rubber component. In the following, such a rubber composition is also referred to as the rubber composition according to the present invention.

Examples of rubber materials that can be used as the rubber component in the present invention include diene rubbers such as natural rubber (NR), polyisoprene rubber (IR), polybutadiene rubber (BR), styrene butadiene rubber (SBR), styrene isoprene butadiene rubber (SIBR), ethylene propylene diene rubber (EPDM), chloroprene rubber (CR), acrylonitrile butadiene rubber (NBR), and butyl rubber (IIR). These rubber materials may be used alone, or two or more of these may be used in combination. In particular, NR, BR, and SBR are preferred, and SBR is more preferred, because they provide a good balance of grip performance and abrasion resistance.

The SBR is not particularly limited, and examples include emulsion-polymerized styrene butadiene rubber (E-SBR) and solution-polymerized styrene butadiene rubber (S-SBR). Preferred among these is S-SBR because then the effect of the present invention can be suitably achieved.

The SBR preferably has a vinyl content of 10% by mass or more, more preferably 20% by mass or more, and still more preferably 30% by mass or more. If the vinyl content is less than 10% by mass, sufficient grip performance may not be obtained. The vinyl content is preferably 90% by mass or less, more preferably 75% by mass or less, and still more preferably 50% by mass or less. If the vinyl content is more than 90% by mass, abrasion resistance tends to be deteriorated. The vinyl content in SBR can be measured by infrared absorption spectrometry.

The SBR preferably has a styrene content of 20% by mass or more, more preferably 25% by mass or more, and still more preferably 30% by mass or more. If the styrene content is less than 20% by mass, sufficient grip performance tends not to be obtained. The styrene content is also preferably 60% by mass or less, and more preferably 50% by mass or less. If the styrene content is more than 60% by mass, abrasion resistance tends to be lowered and, at the same time, temperature dependence tends to be increased so that performance greatly changes with changes in temperature, with the result that grip performance during running tends not to be well provided. In the present invention, the styrene content in SBR is measured by $^1$H-NMR.

When the rubber composition according to the present invention contains SBR, the SBR content based on 100% by mass of the rubber component is preferably 20% by mass or more, more preferably 40% by mass or more, still more preferably 60% by mass or more, further preferably 80% by mass or more, particularly preferably 90% by mass or more, and most preferably 100% by mass. If the SBR content is less than 20% by mass, sufficient grip performance and sufficient abrasion resistance tend not to be obtained. In the description, the amount of the rubber component and the amount of SBR each refer to the amount of solids.

The rubber composition according to the present invention contains a solventless acrylic resin, which improves grip performance during running.

In the present invention, the solventless acrylic resin refers to a (meth)acrylic resin (polymer) synthesized by high-temperature continuous polymerization (high-temperature continuous bulk polymerization as disclosed in U.S. Pat. No. 4,414,370, JP-A S59-6207, JP-B H05-58005, JP-A H01-313522, U.S. Pat. No. 5,010,166, annual research report TREND2000 No. 3 by Toagosei Co., Ltd., pp. 42-45, and the like, which are all hereby incorporated by reference in their entirety) using no or minimal amounts of auxiliary materials such as polymerization initiators, chain transfer agents, or organic solvents. In the present invention, the term "(meth)acrylic" refers to methacrylic and acrylic.

Because of its production method, the (meth) acrylic resin does not substantially contain auxiliary materials such as polymerization initiators, chain transfer agents, or organic solvents. Moreover, since the (meth)acrylic resin is produced by continuous polymerization, it has a relatively narrow composition distribution and a relatively narrow molecular weight distribution. Presumably, such properties of the (meth)acrylic resin allow the effect of the present invention to be suitably achieved.

Examples of the monomer component forming the (meth) acrylic resin include (meth)acrylic acid and (meth)acrylic acid derivatives such as (meth)acrylic acid esters (alkyl esters, aryl esters, aralkyl esters, etc.), (meth)acrylamide and (meth)acrylamide derivatives. The term "(meth)acrylic acid" is a general term for acrylic acid and methacrylic acid.

Moreover, the monomer component of the (meth)acrylic resin may include, in addition to the (meth)acrylic acid or (meth)acrylic) acrylic acid derivative, aromatic vinyls such as styrene, α-methylstyrene, vinyltoluene, vinylnaphthalene, divinylbenzene, trivinylbenzene, or divinylnaphthalene.

The solventless acrylic resin may be formed either only of a (meth)acrylic component or of a combination of a (meth) acrylic component and another component. The solventless acrylic resin is preferably a styrene acrylic resin (solventless styrene acrylic resin) formed of a combination of a (meth) acrylic component and a component derived from styrene because in such a case the effect of the present invention can be more suitably achieved.

The solventless acrylic resin may contain a hydroxy group, a carboxyl group, a silanol group, or the like. In particular, the solventless acrylic resin preferably contains a hydroxy group or a carboxyl group because in such a case the effect of the present invention can be more suitably achieved. From the standpoint of improving grip performance during running, abrasion resistance and the like, the solventless acrylic resin more preferably contains a carboxyl group.

Examples of commercial products of the solventless acrylic resin include, but are not limited to, ARUFON series (UP-1000, UP-1010, UP-1020, UP-1021, UP-1061, UP-1070, UP-1080, UP-1110, UP-1170, UH-2032, UH-2041, UH-2170, UC3900, UCX-3510) produced by TOAGOSEI CO., LTD.

The solventless acrylic resin preferably has a glass transition temperature (Tg) (° C./DSC) of 0° C. or higher, more preferably 30° C. or higher, and still more preferably 50° C. or higher. The Tg is also preferably 100° C. or lower, more preferably 85° C. or lower, and still more preferably 70° C. or lower. If the Tg is lower than 0° C., though the effect of improving initial grip performance is achieved, grip performance during running or abrasion resistance may not be well provided. If the Tg is higher than 100° C., though the effect of improving grip performance during running is achieved, initial grip performance or abrasion resistance may not be well provided. In the present invention, the glass transition temperature of the solventless acrylic resin is measured by differential scanning calorimetry (DSC) at a rate of temperature rise of 10° C./min in conformity with JIS-K7121.

The solventless acrylic resin preferably has an acid value of 15 mgKOH/g or more, more preferably 40 mgKOH/g or more, and still more preferably 70 mgKOH/g or more. From the standpoint of improving grip performance during running, abrasion resistance and the like, the acid value is particularly preferably 100 mgKOH/g or more. The acid value is also preferably 250 mgKOH/g or less, more preferably 200 mgKOH/g or less, and still more preferably 120 mgKOH/g or less. If the acid value is less than 15 mgKOH/g, high levels of initial grip performance and grip performance during running may not be simultaneously achieved. If the acid value is more than 250 mgKOH/g, the compatibility with the rubber component may be deteriorated, resulting in insufficient tensile properties and significantly deteriorated abrasion resistance. In the present invention, the acid value of the solventless acrylic resin is a value indicating the amount in mg of potassium hydroxide required to neutralize the acid contained in 1 g of the solventless acrylic resin, which is determined by potentiometric titration (JIS K 0070:1992).

The solventless acrylic resin preferably has a weight average molecular weight (Mw) of 2000 or more, and more preferably 3000 or more. The Mw is also preferably 20000 or less, and more preferably 15000 or less. From the standpoint of improving grip performance during running, abrasion resistance and the like, it is still more preferably 10000 or less, and particularly preferably 6000 or less. If the Mw is less than 2000, though initial grip performance is improved, grip performance during running may not be well provided. If the Mw is more than 20000, such a solventless acrylic resin has a high softening point and may not be miscible with the rubber component and the like. In the present invention, the Mw of the solventless acrylic resin is determined by gel permeation chromatography (GPC) relative to polystyrene standards.

As described above, the solventless acrylic resin does not substantially contain auxiliary materials such as polymerization initiators, chain transfer agents, or organic solvents, and therefore is high in purity. The purity of the solventless acrylic resin (i.e., the resin content in the resin) is preferably 95% by mass or higher, and more preferably 97% by mass or higher.

In the rubber composition according to the present invention, the solventless acrylic resin content per 100 parts by mass of the rubber component is 1 part by mass or more, preferably 5 parts by mass or more, more preferably 6 parts by mass or more, and still more preferably 7 parts by mass or more. Also, the content is 50 parts by mass or less, preferably 40 parts by mass or less, more preferably 30 parts by mass or less, and still more preferably 20 parts by mass or less. If the content is less than 1 part by mass, the resulting tacky effect may not be sufficient to simultaneously improve initial grip performance and grip performance during running. If the content is more than 50 parts by mass, insufficient tensile properties and deteriorated abrasion resistance may be provided.

The rubber composition according to the present invention contains a liquid xylene resin. The liquid xylene resin is liquid at room temperature (25° C.). The use of the liquid xylene resin in combination with the solventless acrylic resin described above greatly improves initial grip performance and abrasion resistance, in particular. Therefore, a high-level balanced improvement in abrasion resistance, initial grip performance, and grip performance during running, especially on dry roads, is achieved.

The liquid xylene resin is a multimer in which xylenes are bonded to each other through a C1-C10, preferably C1-C5, more preferably C1-C3 alkylene group and/or a dialkylene ether bond (—$R^a$—O—$R^b$— in which $R^a$ and $R^b$ are the same as or different from each other and each represent a C1-C10, preferably C1-C5, more preferably C1-C3 alkylene group). Specifically, the liquid xylene resin has a structural unit represented by formula (1) below. For enhanced reactivity, the multimer may also be modified with phenols or polyols, or contain a carboxyl group, a hydroxy group, a silanol group, or the like. In particular, it preferably contains a hydroxy group.

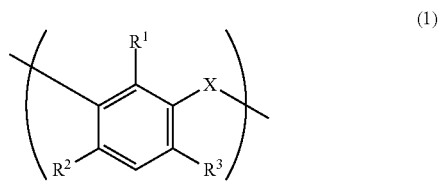

(1)

In the formula, any two of $R^1$, $R^2$, and $R^3$ represent methyl groups, and the rest represents a hydrogen atom, and X represents a C1-C10, preferably C1-C5, more preferably C1-C3 alkylene group or a C2-C20, preferably C2-C10, more preferably C2-C6 dialkylene ether bond, and is still more preferably a methylene group or a dimethylene ether bond (—$CH_2$—O—$CH_2$—).

Examples of commercial products of the liquid xylene resin include, but are not limited to, NIKANOL series (e.g., Y-50, Y-1000, LLL, LL, L, GH, G) produced by MITSUBISHI GAS CHEMICAL COMPANY, INC. Among these, NIKANOL Y-50 is preferred from the standpoint of improving initial grip performance, while NIKANOL L is preferred from the standpoint of improving abrasion resistance.

The liquid xylene resin preferably has an acid value of 10 mgKOH/g or more, and more preferably 15 mgKOH/g or more. The acid value is also preferably 300 mgKOH/g or less, more preferably 250 mgKOH/g or less, still more preferably 100 mgKOH/g or less, and particularly preferably 40 mgKOH/g or less. If the acid value is less than 10 mgKOH/g, initial grip performance may not be well provided. If the acid value is more than 300 mgKOH/g, the compatibility with the rubber component may be deteriorated, resulting in insufficient tensile properties and significantly deteriorated abrasion resistance. In the present invention, the acid value of the liquid xylene resin is a value indicating the amount in mg of potassium hydroxide required to neutralize the acid contained in 1 g of the liquid xylene resin, which is determined by potentiometric titration (JIS K 0070:1992).

The viscosity at 25° C. of the liquid xylene resin is not particularly limited, and is preferably 20000 mPa·s or lower, more preferably 18000 mPa·s or lower, and still more preferably 15000 mPa·s or lower. From the standpoint of improving initial grip performance, the viscosity is further preferably 500 mPa·s or lower, and particularly preferably 100 mPa·s or lower. If the viscosity is higher than 20000 mPa·s, the resulting effect of improving initial grip performance may be insufficient. Moreover, the lower limit of the viscosity of the liquid xylene resin is preferably 10 mPa·s, and more preferably 30 mPa·s. From the standpoint of improving abrasion resistance, it is still more preferably 3000 mPa·s, and particularly preferably 10000 mPa·s. If the viscosity is lower than 10 mPa·s, the resulting effect of improving abrasion resistance may be insufficient. The viscosity of the liquid xylene resin is measured at 25° C. with a capillary viscometer.

The liquid xylene resin content per 100 parts by mass of the rubber component is 5 parts by mass or more, preferably 10 parts by mass or more, more preferably 11 parts by mass or more, and still more preferably 12 parts by mass or more. Also, the content is 100 parts by mass or less, preferably 60 parts by mass or less, more preferably 40 parts by mass or less. From the standpoint of improving initial grip performance and grip performance during running, it is still more preferably 25 parts by mass or less. If the content is less than 5 parts by mass, the resulting modifying effect may not be sufficient to simultaneously improve initial grip performance and grip performance during running. If the content is more than 100 parts by mass, insufficient tensile properties and significantly deteriorated abrasion resistance may be provided.

In the present invention, resins commonly used in conventional rubber compositions for tires, such as coumarone resins or aromatic petroleum resins, may also be used together with the solventless acrylic resin and the liquid xylene resin. In particular, preferred are low softening point resins having low softening points and high softening point resins having high softening points. More preferred are combinations of low softening point resins and high softening point resins. The use of a low softening point resin more improves initial grip performance, while the use of a high softening point resin provides better grip performance during running. Moreover, the combined use of a low softening point resin and a high softening point resin with the solventless acrylic resin and the liquid xylene resin simultaneously highly improves initial grip performance and grip performance during running.

The low softening point resin preferably has a softening point of 60° C. or higher, and more preferably 70° C. or higher. The softening point is also preferably 119° C. or lower, and more preferably 110° C. or lower. If the softening point is lower than 60° C., grip performance during running may not be provided. If the softening point is higher than 119° C., initial grip performance may be lowered.

In the present invention, the softening point of the resin is determined as set forth in JIS K 6220-1:2001 with a ring and ball softening point tester and is defined as the temperature at which the ball drops down.

The low softening point resin is not particularly limited as long as it has a softening point within the range described above, and is preferably a coumarone resin.

The coumarone resin is not particularly limited as long as it is formed of coumarone, and examples include coumarone resin and coumarone-indene resin. Preferred among these is coumarone-indene resin.

When the rubber composition according to the present invention contains a low softening point resin, the low softening point resin content per 100 parts by mass of the rubber component is preferably 1 part by mass or more, more preferably 3 parts by mass or more, and still more preferably 5 parts by mass or more. The low softening point resin content is preferably 35 parts by mass or less, more preferably 30 parts by mass or less, still more preferably 20 parts by mass or less, and particularly preferably 15 parts by mass or less. When the low softening point resin content falls within the range described above, initial grip performance can be more highly improved.

The high softening point resin preferably has a softening point of 120° C. or higher, and more preferably 140° C. or higher. The softening point is also preferably 200° C. or lower, and more preferably 180° C. or lower. If the softening point is lower than 120° C., grip performance during running may not be provided. If the softening point is higher than 200° C., initial grip performance may be lowered.

The softening point of the resin is measured as described above.

The high softening point resin is not particularly limited as long as it has a softening point within the range described above, and is preferably an aromatic petroleum resin.

The aromatic petroleum resin is not particularly limited, and examples include Nisseki Neopolymers 170S and 140S produced by JX Oil & Energy Corporation.

When the rubber composition according to the present invention contains a high softening point resin, the high softening point resin content per 100 parts by mass of the rubber component is preferably 1 part by mass or more, more preferably 3 parts by mass or more, and still more preferably 5 parts by mass or more. The high softening point resin content is also preferably 35 parts by mass or less, more preferably 30 parts by mass or less, still more preferably 20 parts by mass or less, and particularly preferably 15 parts by mass or less. When the high softening point resin content falls within the range described above, grip performance during running can be more highly improved.

In the present invention, from the standpoint of initial grip performance, grip performance during running and the like, a softener is preferably used in addition to the above-described resins (the solventless acrylic resin and the liquid xylene resin, and optionally the high softening point resin and/or the low softening point resin). The softener is not particularly limited, and examples include oils and liquid diene polymers.

Examples of the oil include process oils such as paraffinic, aromatic, and naphthenic process oils. Preferred among these is aromatic process oil.

When the rubber composition according to the present invention contains an oil, the oil content per 100 parts by mass of the rubber component is preferably 30 parts by mass or more, and more preferably 45 parts by mass or more. The oil content is also preferably 85 parts by mass or less, and more preferably 75 parts by mass or less. If the content is less than 30 parts by mass, sufficient grip performance may not be obtained. If the content is more than 85 parts by mass, abrasion resistance tends to be deteriorated. The oil content as used herein includes the amount of oils contained in oil-extended rubbers.

The liquid diene polymer is liquid at room temperature (25° C.)

The liquid diene polymer preferably has a polystyrene-equivalent weight average molecular weight (Mw) measured by gel permeation chromatography (GPC) of $1.0 \times 10^3$ to $2.0 \times 10^5$, and more preferably $3.0 \times 10^3$ to $1.5 \times 10^4$. If the Mw is less than $1.0 \times 10^3$, abrasion resistance and tensile properties may be lowered so that sufficient durability cannot be ensured. Conversely, if the Mw is more than $2.0 \times 10^5$, the viscosity of the polymer solution may become too high, thereby deteriorating productivity. In the present invention, the Mw of the liquid diene polymer is determined by gel permeation chromatography (GPC) relative to polystyrene standards.

Examples of the liquid diene polymer include liquid styrene butadiene copolymers (liquid SBR), liquid polybutadiene polymers (liquid BR), liquid polyisoprene polymers (liquid IR), and liquid styrene isoprene copolymers (liquid SIR). Preferred among these is liquid SBR because then the effect of the present invention can be suitably achieved.

The liquid SBR preferably has a vinyl content of 10% by mass or more, more preferably 20% by mass or more, and still more preferably 35% by mass or more. If the vinyl content is less than 10% by mass, sufficient grip performance may not be obtained. The vinyl content is preferably 90% by mass or less, more preferably 75% by mass or less, and still more preferably 55% by mass or less. If the vinyl content is more than 90% by mass, abrasion resistance tends to be deteriorated. The vinyl content in liquid SBR can be measured by infrared absorption spectrometry.

The liquid SBR preferably has a styrene content of 10% by mass or more, more preferably 20% by mass or more, and still more preferably 35% by mass or more. If the styrene content is less than 10% by mass, sufficient grip performance may not be obtained. The styrene content is preferably 60% by mass or less, and more preferably 50% by mass or less. If the styrene content is more than 60% by mass, the softening point may become so high that the resulting rubber may become hard and have deteriorated grip performance. The styrene content in liquid SBR is measured by $^1$H-NMR.

When the rubber composition according to the present invention contains a liquid diene polymer, the liquid diene polymer content per 100 parts by mass of the rubber component is preferably 10 parts by mass or more, and more preferably 20 parts by mass or more. The content is also preferably 120 parts by mass or less, more preferably 80 parts by mass or less, and still more preferably 50 parts by mass or less. If the content is less than 10 parts by mass, sufficient grip performance tends not to be obtained. If the content is more than 120 parts by mass, abrasion resistance tends to be deteriorated.

The rubber composition according to the present invention preferably further contains a thermoplastic acrylic acid ester polymer. The use of a thermoplastic acrylic acid ester polymer together with the solventless acrylic resin and the liquid xylene resin provides tackiness to the rubber, especially at low temperatures, to enable a further improvement in initial grip performance while maintaining the improvements in grip performance during running and the like provided by the solventless acrylic resin and the liquid xylene resin. Moreover, such a use further improves abrasion resistance. Therefore, the effect of the present invention can be more suitably achieved.

In the present invention, the thermoplastic acrylic acid ester polymer is produced by suspension polymerization.

In the thermoplastic acrylic acid ester polymer produced by suspension polymerization, the amount of low molecular weight components and residual monomers is smaller and the molecular weight distribution is narrower than in those produced by other polymerization methods. Such a polymer improves the tensile properties and abrasion resistance of the rubber composition.

Examples of the monomer component forming the thermoplastic acrylic acid ester polymer include acrylic acid esters (alkyl esters, aryl esters, aralkyl esters, etc.) such as butyl acrylate, ethyl acrylate, and 2-ethylhexyl acrylate. Examples other than acrylic acid esters include (meth) acrylic acid, (meth)acrylic acid derivatives, acrylonitrile, styrene, α-methylstyrene, vinyltoluene, vinylnaphthalene, divinylbenzene, trivinylbenzene, and divinylnaphthalene.

Preferably, the thermoplastic acrylic acid ester polymer mainly contains a butyl acrylate component because in such a case the effect of the present invention can be more suitably achieved.

The thermoplastic acrylic acid ester polymer may also contain a hydroxy group, a carboxyl group, a silanol group, or the like. Particularly, the thermoplastic acrylic acid ester polymer preferably contains a hydroxy group.

Examples of commercial products of the thermoplastic acrylic acid ester polymer include, but are not limited to, PARACRON series (SN-50, AS-3000E, ME-2000, W-116.3, W-248E, W-197C, PANLON2012) produced by Negami Chemical Industrial Co., Ltd.

The thermoplastic acrylic acid ester polymer preferably has a glass transition temperature (Tg) (° C./DSC) of −60° C. or higher, and more preferably −50° C. or higher. The Tg is also preferably 20° C. or lower, more preferably 0° C. or lower, still more preferably −20° C. or lower, and particularly preferably −30° C. or lower. If the Tg is lower than −60° C., though the effect of improving initial grip performance is achieved, grip performance during running may not be provided. If the Tg is higher than 20° C., though the effect of improving grip performance during running is achieved, initial grip performance may not be improved sufficiently. In the present invention, the Tg of the thermoplastic acrylic acid ester polymer is measured by differential scanning calorimetry (DSC) at a rate of temperature rise of 10° C./min in conformity with JIS-K7121.

The thermoplastic acrylic acid ester polymer preferably has a weight average molecular weight (Mw) of 100000 or more, and more preferably 400000 or more. From the standpoint of improving initial grip performance, the Mw is still more preferably 750000 or more. The Mw is also preferably 1200000 or less, and more preferably 1000000 or less. From the standpoint of improving grip performance during running and abrasion resistance, the Mw is still more preferably 700000 or less. If the Mw is less than 100000, sufficient tensile strength cannot be ensured and abrasion resistance may not be improved. If the Mw is more than 1200000, initial grip performance may not be improved sufficiently. In the present invention, the Mw of the thermoplastic acrylic acid ester polymer is determined by gel permeation chromatography (GPC) relative to polystyrene standards.

When the rubber composition according to the present invention contains a thermoplastic acrylic acid ester polymer, the thermoplastic acrylic acid ester polymer content per 100 parts by mass of the rubber component is preferably 1 part by mass or more, more preferably 5 parts by mass or more, and still more preferably 10 parts by mass or more. The content is also preferably 50 parts by mass or less, more preferably 30 parts by mass or less, and still more preferably 20 parts by mass or less. If the content is less than 1 part by mass, initial grip performance may not be improved and abrasion resistance may not be improved. If the content is more than 50 parts by mass, such an amount of thermoplastic acrylic acid ester polymer may be difficult to disperse in rubber, and thereby lead to deteriorated abrasion resistance.

The combined amount of the solventless acrylic resin, the liquid xylene resin, the high softening point resin, the low softening point resin, the oil, the liquid diene polymer, and the thermoplastic acrylic acid ester polymer mentioned above is preferably 50 to 250 parts by mass, more preferably 90 to 200 parts by mass, and still more preferably 130 to 190 parts by mass, per 100 parts by mass of the rubber component. When the combined amount falls within the range described above, the effect of the present invention can be more suitably achieved.

In the present invention, a reinforcing filler may be used which is arbitrarily selected from those commonly used in conventional rubber compositions for tires, such as carbon black, silica, calcium carbonate, alumina, clay, and talc. Preferred among these is carbon black because it provides good abrasion resistance.

From the standpoint of suitably achieving the effect of the present invention, the carbon black content based on 100% by mass of the reinforcing filler is preferably 60% by mass or more, more preferably 80% by mass or more, and still more preferably 100% by mass.

The carbon black may, for example, be produced by the oil furnace method, and two or more kinds of carbon blacks with different colloidal properties may be used in combination. Specific examples include GPF, HAF, ISAF, and SAF. Suitable among these are ISAF and SAF.

The carbon black preferably has a nitrogen adsorption specific surface area ($N_2SA$) of 80 $m^2/g$ or more, more preferably 90 $m^2/g$ or more, and still more preferably 100 $m^2/g$ or more. The $N_2SA$ is also preferably 600 $m^2/g$ or less, more preferably 250 $m^2/g$ or less, and still more preferably 150 $m^2/g$ or less. If the $N_2SA$ is less than 80 $m^2/g$, grip performance tends to be lowered. If the $N_2SA$ is more than 600 $m^2/g$, a good dispersion is less likely to be obtained, which tends to result in reduced abrasion resistance. The nitrogen adsorption specific surface area of carbon black is measured in conformity with JIS K 6217-2:2001.

The carbon black preferably has an oil absorption number (OAN) of 50 ml/100 g or more, and more preferably 100 ml/100 g or more. The OAN is also preferably 250 ml/100 g or less, more preferably 200 ml/100 g or less, and still more preferably 135 ml/100 g or less. If the OAN is less than 50 ml/100 g, sufficient abrasion resistance may not be provided. If the OAN is more than 250 ml/100 g, grip performance may be lowered. The OAN of carbon black is measured in conformity with JIS K6217-4:2008.

When the rubber composition according to the present invention contains carbon black, the carbon black content per 100 parts by mass of the rubber component is preferably 50 parts by mass or more, more preferably 80 parts by mass or more, and still more preferably 110 parts by mass or more. The content is also preferably 200 parts by mass or less, more preferably 180 parts by mass or less, and still more preferably 150 parts by mass or less. If the carbon black content is less than 50 parts by mass, sufficient abrasion resistance and sufficient grip performance may not be provided. If the carbon black content is more than 200 parts by mass, grip performance may be lowered.

The rubber composition according to the present invention may appropriately contain, in addition to the above components, compounding agents commonly used in the tire industry, such as zinc oxide, waxes, antioxidants, stearic acid, vulcanizing agents, e.g., sulfur, vulcanization accelerators, and other materials.

The zinc oxide is not particularly limited, and those used in the rubber field, such as in tires, may be used. The zinc oxide may suitably be fine particle zinc oxide. When fine particle zinc oxide is used, the effect of the present invention can be more suitably achieved. Specifically, the average primary particle size of the zinc oxide is preferably 200 nm or less, more preferably 100 nm or less, and still more preferably 80 nm or less. The lower limit of the average primary particle size is not particularly limited, and is preferably 20 nm, more preferably 30 nm, and still more preferably 50 nm. The average primary particle size of zinc oxide refers to an average particle size (average primary particle size) calculated based on a specific surface area measured by the BET nitrogen adsorption method.

When the rubber composition according to the present invention contains zinc oxide, the zinc oxide content per 100 parts by mass of the rubber component is preferably 0.5 to 10 parts by mass, and more preferably 1 to 5 parts by mass. When the zinc oxide content falls within the range described above, the effect of the present invention can be more suitably achieved.

The antioxidant is not particularly limited, and examples include naphthylamine antioxidants, quinoline antioxidants, diphenylamine antioxidants, p-phenylenediamine antioxidants, hydroquinone derivative antioxidants, phenol (monophenol, bisphenol, trisphenol, polyphenol) antioxidants, thiobisphenol antioxidants, benzimidazole antioxidants, thiourea antioxidants, phosphite antioxidants, and organic thioacid antioxidants.

Examples of naphthylamine antioxidants include phenyl-α-naphthylamine, phenyl-β-naphthylamine, and aldol-α-trimethyl-1,2-naphthylamine.

Examples of quinoline antioxidants include poly(2,2,4-trimethyl-1,2-dihydroquinoline) and 6-ethoxy-2,2,4-trimethyl-1,2-dihydroquinoline.

Examples of diphenylamine antioxidants include p-isopropoxydiphenylamine, p-(p-toluenesulfonylamide)-diphenylamine, N,N-diphenylethylenediamine, and octylated diphenyl amine.

Examples of p-phenylenediamine antioxidants include N-phenyl-N'-(1,3-dimethylbutyl)-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine.

Examples of hydroquinone derivative antioxidants include 2,5-di-(tert-amyl)hydroquinone and 2,5-di-tert-butylhydroquinone.

With regard to phenol antioxidants, examples of monophenol antioxidants include 2,6-di-tert-butyl-4-methylphenol, 2,6-di-tert-butyl-4-ethylphenol, 2,6-di-tert-butylphenol, 1-oxy-3-methyl-4-isopropylbenzene, butylhydroxyanisole, 2,4-dimethyl-6-tert-butylphenol, n-octadecyl-3-(4'-hydroxy-3',5'-di-tert-butylphenyl)-propionate, and styrenated phenol. Examples of bisphenol antioxidants, trisphenol antioxidants, and polyphenol antioxidants include 2,2'-methylene-bis(4-methyl-6-tert-butylphenol), 2,2'-methylene-bis(4-ethyl-6-tert-butylphenol), 4,4'-butylidene-bis(3-methyl-6-tert-butylphenol), 1,1'-bis(4-hydroxyphenyl)cyclohexane, and tetrakis[methylene-3-(3',5'-di-tert-butyl-4'-hydroxyphenyl)propionate]methane.

Examples of thiobisphenol antioxidants include 4,4'-thiobis(6-tert-butyl-3-methylphenol) and 2,2'-thiobis(6-tert-butyl-4-methylphenol). Examples of benzimidazole antioxidants include 2-mercaptomethyl-benzimidazole. Examples of thiourea antioxidants include tributylthiourea. Examples of phosphite antioxidants include tris(nonylphenyl)phosphite. Examples of organic thioacid antioxidants include dilauryl thiodipropionate. The antioxidants may be used alone, or two or more of these may be used in combination.

Among these, preferred are quinoline antioxidants, and more preferred is poly(2,2,4-trimethyl-1,2-dihydroquinoline). Moreover, it is preferred to further use a p-phenylenediamine antioxidant in combination, and particularly preferred to use N-phenyl-N'-(1,3-dimethylbutyl)-p-phenylenediamine in combination. The antioxidant content is preferably 0.1 to 8 parts by mass, and more preferably 2 to 6 parts by mass, per 100 parts by mass of the rubber component.

Examples of the sulfur include powder sulfur, precipitated sulfur, colloidal sulfur, insoluble sulfur, and highly dispersible sulfur. Preferred among these is powder sulfur. The sulfur content is preferably 0.1 to 10 parts by mass, more preferably 0.15 to 5 parts by mass, and still more preferably 0.2 to 2 parts by mass, per 100 parts by mass of the rubber component.

Examples of the vulcanization accelerator include: thiazole vulcanization accelerators such as 2-mercaptobenzothiazole, di-2-benzothiazolyl disulfide, and N-cyclohexyl-2-benzothiazyl sulfenamide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide, and N,N'-diisopropyl-2-benzothiazole sulfenamide; and guanidine vulcanization accelerators such as diphenylguanidine, di(o-tolyl)guanidine, and o-tolyl biguanidine. Among these, preferred are thiazole vulcanization accelerators, and more preferred is di-2-benzothiazolyl disulfide, because then the effect of the present invention can be more suitably achieved. Moreover, it is also preferred to further use a thiuram vulcanization accelerator in combination, and more preferred to use TOT-N in combination. The vulcanization accelerator content per 100 parts by mass of the rubber component is preferably 0.1 parts by mass or more, more preferably 5 parts by mass or more, but preferably 10 parts by mass or less, and more preferably 9 parts by mass or less. If the content is less than 0.1 parts by mass, curing rate tends not to be sufficient to provide good grip performance and good abrasion resistance. If the content is more than 10 parts by mass, blooming may occur, thereby resulting in reduced grip performance and reduced abrasion resistance.

The rubber composition according to the present invention can be prepared by common methods. Specifically, for example, the components mentioned above are kneaded with a Banbury mixer, a kneader, an open roll mill, or the like and then vulcanized to prepare the rubber composition.

By using the rubber composition according to the present invention, it is possible to simultaneously highly improve initial grip performance and grip performance during running while ensuring good abrasion resistance.

The rubber composition according to the present invention can be suitably used in treads for pneumatic tires.

The pneumatic tire of the present invention can be produced by usual methods using the above rubber composition. Specifically, an unvulcanized rubber composition containing a rubber component, a solventless acrylic resin, and a liquid xylene resin, and optionally various compounding agents mentioned above is extruded into the shape of a tire component, such as a tread, and then formed together with other tire components by a usual method on a tire building machine to build an unvulcanized tire, which is then heat pressed in a vulcanizer, whereby a pneumatic tire of the present invention can be formed.

The pneumatic tire of the present invention can be suitably used as a passenger vehicle tire, truck and bus tire, two-wheeled vehicle tire, or high-performance tire and especially as a high-performance tire, particularly a high-performance dry tire. The high-performance tire as used herein refers to a tire that is excellent especially in grip performance, and conceptually includes racing tires used on racing vehicles. Moreover, the dry tire as used herein refers to a tire that is excellent especially in dry grip performance.

EXAMPLES

The present invention is specifically described by reference to, but not limited to, examples.

The chemicals used in examples and comparative examples are listed below.

Styrene butadiene rubber (SBR): Tufdene 4850 (S-SBR, Tg=−25° C., vinyl content=43% by mass, styrene content: 40% by mass, oil content: 50 parts by mass per 100 parts by mass of rubber solids) produced by Asahi Kasei Corporation Carbon black 1: N219 (ISAF, $N_2SA$: 106 $m^2/g$) produced by Cabot Japan K.K.

Carbon black 2: SEAST 9 (SAF, $N_2SA$: 142 $m^2/g$, OAN: 115 ml/100 g) produced by Tokai Carbon Co., Ltd.

Oil: Diana Process AH-24 (aromatic process oil) produced by Idemitsu Kosan Co., Ltd.

Liquid diene polymer: L-SBR-820 (liquid SBR, Mw: $1.0 \times 10^4$, styrene content: 45% by mass) produced by KURARAY CO., LTD.

Resin 1: Coumarone G-90 (coumarone-indene resin (low softening point resin), softening point: 90° C.) produced by NITTO CHEMICAL CO., LTD.

Resin 2: Nisseki Neopolymer 170S (aromatic petroleum resin (high softening point resin), softening point: 160° C.) produced by JX Oil & Energy Corporation Resin 3: Solventless acrylic polymer UH-2170 (solventless acrylic resin (solventless styrene acrylic resin), hydroxy group-containing resin, purity: 98% by mass or higher, Tg: 60° C., acid value (OH value): 88 mgKOH/g, Mw: 14000) produced by TOAGOSEI CO., LTD.

Resin 4: Solventless acrylic polymer UC3900 (solventless acrylic resin (solventless styrene acrylic resin), carboxyl group-containing resin, purity: 98% by mass or higher, Tg: 60° C., acid value (OH value): 108 mgKOH/g, Mw: 4600) produced by TOAGOSEI CO., LTD.

Thermoplastic polymer 1: SN-50 (thermoplastic acrylic acid ester polymer, hydroxy group-containing polymer prepared mainly from butyl acrylate by suspension polymerization, Tg: −43° C., Mw: 800000) produced by Negami Chemical Industrial Co., Ltd.

Thermoplastic polymer 2: AS-3000E (thermoplastic acrylic acid ester polymer, hydroxy group-containing polymer prepared mainly from butyl acrylate by suspension polymerization, Tg: −36° C., Mw: 650000) produced by Negami Chemical Industrial Co., Ltd.

Liquid xylene resin 1: NIKANOL L (hydroxy group-containing resin, viscosity: 12600 mPa·s at 25° C., acid value (OH value): 25 mgKOH/g) produced by MITSUBISHI GAS CHEMICAL COMPANY, INC.

Liquid xylene resin 2: NIKANOL Y-50 (hydroxy group-containing resin, viscosity: 50 mPa·s at 25° C., acid value (OH value): 20 mgKOH/g) produced by MITSUBISHI GAS CHEMICAL COMPANY, INC.

Zinc oxide: Zincox Super F-2 (average primary particle size: 65 nm) produced by HakusuiTech Co., Ltd.

Wax: SUNNOC N produced by OUCHI SHINKO CHEMICAL INDUSTRIAL CO., LTD.

Antioxidant 1: NOCRAC 6C (N-phenyl-N'-(1,3-dimethylbutyl)-p-phenylenediamine) produced by OUCHI SHINKO CHEMICAL INDUSTRIAL CO., LTD.

Antioxidant 2: NOCRAC RD (poly(2,2,4-trimethyl-1,2-dihydroquinoline)) produced by OUCHI SHINKO CHEMICAL INDUSTRIAL CO., LTD.

Antioxidant 3: Antigene 6C (N-phenyl-N'-(1,3-dimethylbutyl)-p-phenylenediamine) produced by Sumitomo Chemical Co., Ltd.

Antioxidant 4: Antigene RD (poly(2,2,4-trimethyl-1,2-dihydroquinoline)) produced by Sumitomo Chemical Co., Ltd.

Stearic acid: TSUBAKI produced by NOF CORPORATION Sulfur 1: powder sulfur produced by TSURUMI CHEMICAL INDUSTRY CO., LTD.

Sulfur 2: powder sulfur produced by Karuizawa Sulfur Co., Ltd.

Vulcanization accelerator 1: NOCCELER DM (di-2-benzothiazolyl disulfide) produced by OUCHI SHINKO CHEMICAL INDUSTRIAL CO., LTD.

Vulcanization accelerator 2: NOCCELER TOT-N (tetrakis(2-ethylhexyl)thiuram disulfide) produced by OUCHI SHINKO CHEMICAL INDUSTRIAL CO., LTD.

EXAMPLES AND COMPARATIVE EXAMPLES

In accordance with the recipes shown in Tables 1 and 2, compounding materials other than sulfur and vulcanization accelerators were kneaded with a 1.7-L Banbury mixer produced by KOBE STEEL, LTD. The kneaded mixture was mixed with the sulfur and vulcanization accelerators and kneaded with an open roll mill to prepare an unvulcanized rubber composition. The unvulcanized rubber composition was formed into a tread shape, assembled with other tire components on a tire building machine, and vulcanized at 150° C. for 30 minutes to prepare a test tire (tire size: 215/45R17).

The thus-prepared test tires were evaluated as described below. Tables 1 and 2 show the test results. In the evaluation, Comparative Example 1-1 was taken as the standard comparative example in Table 1, and Comparative Example 2-1 as the standard comparative example in Table 2.

(Initial Grip Performance)

The test tires were mounted on a front-engine, rear-wheel-drive car (displacement: 2000 cc) made in Japan. A test driver drove the car 10 laps around a test track with a dry asphalt surface, and then evaluated the control stability during steering on the second lap. The results are expressed as an index (index of initial grip performance), with the value in the standard comparative example set equal to 100. A higher index indicates higher initial grip performance. Tires with an index of 110 or higher were considered particularly good.

(Grip Performance During Running)

The test tires were mounted on a front-engine, rear-wheel-drive car (displacement: 2000 cc) made in Japan. A test driver drove the car 10 laps around a test track with a dry asphalt surface, and then comparatively evaluated the control stability during steering on the best lap and the final lap. The results are expressed as an index, with the value in the standard comparative example set equal to 100. A higher index indicates on dry roads a smaller deterioration in grip performance during running and therefore good grip performance during running. Tires with an index of 110 or higher were considered particularly good.

(Abrasion Resistance)

The test tires were mounted on a front-engine, rear-wheel-drive car (displacement: 2000 cc) made in Japan. A test driver drove the car in a test track with a dry asphalt surface, and then the remaining groove depth in the tire tread rubber (initial depth: 15 mm) was measured. The remaining groove depths are expressed as an index (index of abrasion resistance), with the value in the standard comparative example set equal to 100. A higher index indicates higher abrasion resistance. Tires with an index of 110 or higher were considered particularly good.

TABLE 1

| | | Comparative Example | | | | | | |
|---|---|---|---|---|---|---|---|---|
| | | 1-1 | 1-2 | 1-3 | 1-4 | 1-5 | 1-6 | 1-7 |
| Amount (parts by mass) | SBR (solid content) | 150 (100) | 150 (100) | 150 (100) | 150 (100) | 150 (100) | 150 (100) | 150 (100) |
| | Carbon black 1 | 130 | 130 | 130 | 130 | 130 | 130 | 130 |
| | Oil | 15 | 15 | 15 | 15 | 15 | 15 | 15 |
| | Liquid diene polymer | 90 | 70 | 70 | 60 | 40 | 40 | 40 |
| | Resin 1 | — | 20 | — | 10 | 10 | 10 | 10 |
| | Resin 2 | — | — | 20 | 10 | 10 | 10 | 10 |
| | Resin 3 | — | — | — | 10 | — | — | — |
| | Resin 4 | — | — | — | — | 30 | — | — |
| | Liquid xylene resin 1 | — | — | — | — | — | 30 | — |
| | Liquid xylene resin 2 | — | — | — | — | — | — | 30 |
| | Zinc oxide | 2 | 2 | 2 | 2 | 2 | 2 | 2 |
| | Wax | 1 | 1 | 1 | 1 | 1 | 1 | 1 |
| | Antioxidant 1 | 1 | 1 | 1 | 1 | 1 | 1 | 1 |
| | Antioxidant 2 | 3 | 3 | 3 | 3 | 3 | 3 | 3 |
| | Stearic acid | 1 | 1 | 1 | 1 | 1 | 1 | 1 |
| | Sulfur 1 | 0.6 | 0.6 | 0.6 | 0.6 | 0.6 | 0.6 | 0.6 |
| | Vulcanization accelerator 1 | 4 | 4 | 4 | 4 | 4 | 4 | 4 |
| | Vulcanization accelerator 2 | 3 | 3 | 3 | 3 | 3 | 3 | 3 |
| Evaluation results | Index of initial grip performance | 100 | 120 | 75 | 125 | 119 | 130 | 135 |
| | Index of grip performance during running | 100 | 85 | 130 | 115 | 130 | 105 | 98 |
| | Index of abrasion resistance | 100 | 94 | 98 | 105 | 119 | 105 | 100 |
| | Average | 100 | 100 | 101 | 115 | 123 | 113 | 111 |

| | | Example | | | | | |
|---|---|---|---|---|---|---|---|
| | | 1-1 | 1-2 | 1-3 | 1-4 | 1-5 | 1-6 |
| Amount (parts by mass) | SBR (solid content) | 150 (100) | 150 (100) | 150 (100) | 150 (100) | 150 (100) | 150 (100) |
| | Carbon black 1 | 130 | 130 | 130 | 130 | 130 | 130 |
| | Oil | 15 | 15 | 15 | 15 | 15 | 15 |

TABLE 1-continued

|  |  | | | | | | |
|---|---|---|---|---|---|---|---|
| | Liquid diene polymer | 40 | 40 | 40 | 40 | 40 | 40 |
| | Resin 1 | 10 | 10 | 10 | 10 | 10 | 10 |
| | Resin 2 | 10 | 10 | 10 | 10 | 10 | 10 |
| | Resin 3 | 15 | 15 | — | — | 10 | — |
| | Resin 4 | — | — | 15 | 15 | — | 10 |
| | Liquid xylene resin 1 | 15 | — | 15 | — | 20 | — |
| | Liquid xylene resin 2 | — | 15 | — | 15 | — | 20 |
| | Zinc oxide | 2 | 2 | 2 | 2 | 2 | 2 |
| | Wax | 1 | 1 | 1 | 1 | 1 | 1 |
| | Antioxidant 1 | 1 | 1 | 1 | 1 | 1 | 1 |
| | Antioxidant 2 | 3 | 3 | 3 | 3 | 3 | 3 |
| | Stearic acid | 1 | 1 | 1 | 1 | 1 | 1 |
| | Sulfur 1 | 0.6 | 0.6 | 0.6 | 0.6 | 0.6 | 0.6 |
| | Vulcanization accelerator 1 | 4 | 4 | 4 | 4 | 4 | 4 |
| | Vulcanization accelerator 2 | 3 | 3 | 3 | 3 | 3 | 3 |
| Evaluation results | Index of initial grip performance | 130 | 135 | 140 | 145 | 150 | 155 |
| | Index of grip performance during running | 125 | 130 | 132 | 130 | 135 | 130 |
| | Index of abrasion resistance | 115 | 112 | 125 | 120 | 112 | 110 |
| | Average | 123 | 126 | 132 | 132 | 132 | 132 |

TABLE 2

| | | Comparative Example | | | | | | | | | |
|---|---|---|---|---|---|---|---|---|---|---|---|
| | | 2-1 | 2-2 | 2-3 | 2-4 | 2-5 | 2-6 | 2-7 | 2-8 | 2-9 | 2-10 |
| Amount (parts by mass) | SBR (solid content) | 150 (100) | 150 (100) | 150 (100) | 150 (100) | 150 (100) | 150 (100) | 150 (100) | 150 (100) | 150 (100) | 150 (100) |
| | Carbon black 2 | 130 | 130 | 130 | 130 | 130 | 130 | 130 | 130 | 130 | 130 |
| | Oil | 15 | 15 | 15 | 15 | 15 | 15 | 15 | 15 | 15 | 15 |
| | Liquid diene polymer | 90 | 105 | 75 | 75 | 75 | 75 | 75 | 75 | 60 | 60 |
| | Resin 2 | 15 | — | 15 | 15 | 15 | 15 | 15 | 15 | 15 | 15 |
| | Resin 3 | — | — | 15 | — | — | — | — | — | 15 | 15 |
| | Resin 4 | — | — | — | 15 | — | — | — | — | — | — |
| | Thermoplastic polymer 1 | — | — | — | — | 15 | — | — | — | 15 | — |
| | Thermoplastic polymer 2 | — | — | — | — | — | 15 | — | — | — | 15 |
| | Liquid xylene resin 1 | — | — | — | — | — | — | 15 | — | — | — |
| | Liquid xylene resin 2 | — | — | — | — | — | — | — | 15 | — | — |
| | Zinc oxide | 2 | 2 | 2 | 2 | 2 | 2 | 2 | 2 | 2 | 2 |
| | Wax | 1 | 1 | 1 | 1 | 1 | 1 | 1 | 1 | 1 | 1 |
| | Antioxidant 3 | 1 | 1 | 1 | 1 | 1 | 1 | 1 | 1 | 1 | 1 |
| | Antioxidant 4 | 3 | 3 | 3 | 3 | 3 | 3 | 3 | 3 | 3 | 3 |
| | Stearic acid | 1 | 1 | 1 | 1 | 1 | 1 | 1 | 1 | 1 | 1 |
| | Sulfur 2 | 0.6 | 0.6 | 0.6 | 0.6 | 0.6 | 0.6 | 0.6 | 0.6 | 0.6 | 0.6 |
| | Vulcanization accelerator 1 | 4 | 4 | 4 | 4 | 4 | 4 | 4 | 4 | 4 | 4 |
| | Vulcanization accelerator 2 | 3 | 3 | 3 | 3 | 3 | 3 | 3 | 3 | 3 | 3 |
| Evaluation results | Index of initial grip performance | 100 | 110 | 95 | 85 | 105 | 102 | 105 | 110 | 100 | 98 |
| | Index of grip performance during running | 100 | 90 | 105 | 120 | 100 | 100 | 90 | 90 | 105 | 108 |
| | Index of abrasion resistance | 100 | 105 | 100 | 100 | 105 | 105 | 100 | 100 | 105 | 105 |
| | Average | 100 | 101 | 100 | 102 | 103 | 102 | 98 | 100 | 103 | 104 |

| | | Comparative Example | | Example | | | | | | |
|---|---|---|---|---|---|---|---|---|---|---|
| | | 2-11 | 2-12 | 2-1 | 2-2 | 2-3 | 2-4 | 2-5 | 2-6 | 2-7 |
| Amount (parts by mass) | SBR (solid content) | 150 (100) | 150 (100) | 150 (100) | 150 (100) | 150 (100) | 150 (100) | 150 (100) | 150 (100) | 150 (100) |
| | Carbon black 2 | 130 | 130 | 130 | 130 | 130 | 130 | 130 | 130 | 130 |
| | Oil | 15 | 15 | 15 | 15 | 15 | 15 | 15 | 15 | 15 |
| | Liquid diene polymer | 60 | 60 | 30 | 30 | 30 | 30 | 30 | 30 | 45 |
| | Resin 2 | 15 | 15 | 15 | 15 | 15 | 15 | 15 | 15 | 15 |
| | Resin 3 | — | — | 15 | 15 | 15 | 15 | — | — | 15 |
| | Resin 4 | 15 | 15 | — | — | — | — | 15 | 15 | — |
| | Thermoplastic polymer 1 | 15 | — | 15 | 15 | — | — | 15 | 15 | — |
| | Thermoplastic polymer 2 | — | 15 | — | — | 15 | 15 | — | — | — |
| | Liquid xylene resin 1 | — | — | 30 | — | 30 | — | 30 | — | 30 |
| | Liquid xylene resin 2 | — | — | — | 30 | — | 30 | — | 30 | — |
| | Zinc oxide | 2 | 2 | 2 | 2 | 2 | 2 | 2 | 2 | 2 |
| | Wax | 1 | 1 | 1 | 1 | 1 | 1 | 1 | 1 | 1 |
| | Antioxidant 3 | 1 | 1 | 1 | 1 | 1 | 1 | 1 | 1 | 1 |
| | Antioxidant 4 | 3 | 3 | 3 | 3 | 3 | 3 | 3 | 3 | 3 |
| | Stearic acid | 1 | 1 | 1 | 1 | 1 | 1 | 1 | 1 | 1 |
| | Sulfur 2 | 0.6 | 0.6 | 0.6 | 0.6 | 0.6 | 0.6 | 0.6 | 0.6 | 0.6 |
| | Vulcanization accelerator 1 | 4 | 4 | 4 | 4 | 4 | 4 | 4 | 4 | 4 |
| | Vulcanization accelerator 2 | 3 | 3 | 3 | 3 | 3 | 3 | 3 | 3 | 3 |

TABLE 2-continued

| | | | | | | | | | | |
|---|---|---|---|---|---|---|---|---|---|---|
| Evaluation results | Index of initial grip performance | 95 | 90 | 105 | 110 | 105 | 108 | 103 | 105 | 102 |
| | Index of grip performance during running | 120 | 125 | 110 | 110 | 112 | 115 | 120 | 120 | 109 |
| | Index of abrasion resistance | 105 | 100 | 115 | 115 | 120 | 118 | 120 | 120 | 110 |
| | Average | 107 | 105 | 110 | 112 | 112 | 114 | 114 | 115 | 107 |

Tables 1 and 2 demonstrate that, in the examples in which a solventless acrylic resin and a liquid xylene resin were used, initial grip performance and grip performance during running, especially on dry roads, were simultaneously highly improved while ensuring good abrasion resistance. Particularly, the combined use of those resins with a low softening point resin and/or a high softening point resin or with a thermoplastic polymer very significantly improved the balance among these properties.

The invention claimed is:

1. A pneumatic tire, comprising a tread formed from a rubber composition, wherein the rubber composition:
   contains a rubber component, a solventless acrylic resin, a liquid xylene resin, and a thermoplastic acrylic acid ester polymer, wherein the thermoplastic acrylic acid ester polymer has a glass transition temperature of −60° C. to 20° C.; and
   has a solventless acrylic resin content of 1 to 50 parts by mass and a liquid xylene resin content of 5 to 100 parts by mass, each per 100 parts by mass of the rubber component.

2. A pneumatic tire, comprising a tread formed from a rubber composition, wherein the rubber composition:
   contains a rubber component, a solventless acrylic resin, a liquid xylene resin, and a thermoplastic acrylic acid ester polymer, wherein the thermoplastic acrylic acid ester polymer has a weight average molecular weight of 100000 to 1200000; and
   has a solventless acrylic resin content of 1 to 50 parts by mass and a liquid xylene resin content of 5 to 100 parts by mass, each per 100 parts by mass of the rubber component.

3. A pneumatic tire, comprising a tread formed from a rubber composition, wherein the rubber composition:
   contains a rubber component, a solventless acrylic resin, a liquid xylene resin, and a thermoplastic acrylic acid ester polymer, wherein the thermoplastic acrylic acid ester polymer is produced by suspension polymerization; and
   has a solventless acrylic resin content of 1 to 50 parts by mass and a liquid xylene resin content of 5 to 100 parts by mass, each per 100 parts by mass of the rubber component.

* * * * *